United States Patent [19]
Jois et al.

[11] Patent Number: 5,928,410
[45] Date of Patent: Jul. 27, 1999

[54] SUPPORTED GAS SEPARATION MEMBRANE, PROCESS FOR ITS MANUFACTURE AND USE OF THE MEMBRANE IN THE SEPARATION OF GASES

[75] Inventors: Yajnanarayana H. R. Jois, East Fishkill; John Reale, Jr., Wappinger Falls, both of N.Y.

[73] Assignee: Texaco Inc., White Plains, N.Y.

[21] Appl. No.: 08/987,444

[22] Filed: Dec. 9, 1997

[51] Int. Cl.$^6$ .......................... B01D 53/22; B01D 69/12; B01D 71/64

[52] U.S. Cl. ............................ 95/51; 95/45; 96/8; 96/10; 96/13; 96/14; 55/DIG. 5

[58] Field of Search ................ 55/524, DIG. 5; 95/45, 51; 96/8, 10, 13, 14

[56] References Cited

U.S. PATENT DOCUMENTS

| | | | |
|---|---|---|---|
| 4,512,893 | 4/1985 | Makino et al. | 210/500.2 |
| 4,705,540 | 11/1987 | Hayes | 95/51 |
| 4,717,394 | 1/1988 | Hayes | 55/16 |
| 4,818,452 | 4/1989 | Kneifel et al. | 264/41 |
| 4,902,422 | 2/1990 | Pinnau et al. | 210/500.23 |
| 4,981,497 | 1/1991 | Hayes | 55/16 |
| 4,988,371 | 1/1991 | Jeanes et al. | 96/13 X |
| 5,042,993 | 8/1991 | Meier et al. | 55/16 |
| 5,055,116 | 10/1991 | Kohn et al. | 95/51 X |
| 5,067,970 | 11/1991 | Wang et al. | 55/16 |
| 5,165,963 | 11/1992 | Matsumoto et al. | 427/245 |
| 5,178,940 | 1/1993 | Matsumoto et al. | 428/304.4 |
| 5,234,471 | 8/1993 | Weinberg | 95/47 |
| 5,248,319 | 9/1993 | Ekiner et al. | 95/54 |
| 5,262,056 | 11/1993 | Koros et al. | 210/654 |
| 5,286,280 | 2/1994 | Chiou | 96/13 X |
| 5,558,936 | 9/1996 | Chung et al. | 96/14 X |
| 5,591,250 | 1/1997 | Stern et al. | 95/51 |
| 5,633,039 | 5/1997 | Avrillon | 427/246 |
| 5,702,503 | 12/1997 | Tse Tang | 96/13 X |
| 5,749,943 | 5/1998 | Shimazu et al. | 96/14 X |
| 5,817,165 | 10/1998 | Hachisuka et al. | 96/13 X |
| 5,820,992 | 10/1998 | Jadhav et al. | 96/13 X |

*Primary Examiner*—Robert Spitzer
*Attorney, Agent, or Firm*—Henry H. Gibson; Dilworth & Barrese

[57] ABSTRACT

A supported gas separation membrane for separating a particular component from a mixture of gases, a process for its manufacture and the use of the membrane in the separation of gases are provided in which the supported gas separation membrane comprises (a) a porous polymeric support layer and (b) an asymmetric gas separation membrane layer formed from a polyimide having repeating units of the general formula:

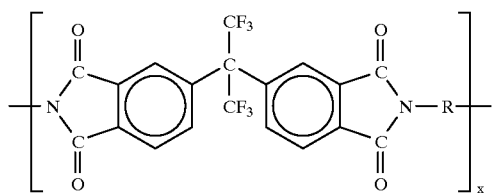

wherein R is:

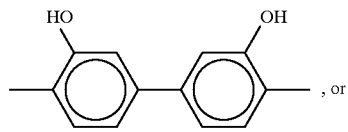

, or

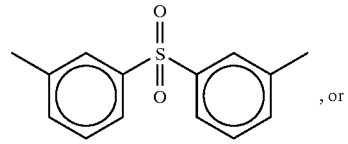

, or

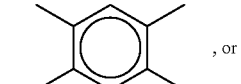

, or

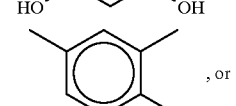

, or

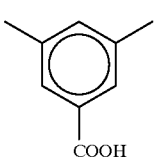

and x is an integer.

31 Claims, No Drawings

SUPPORTED GAS SEPARATION MEMBRANE, PROCESS FOR ITS MANUFACTURE AND USE OF THE MEMBRANE IN THE SEPARATION OF GASES

BACKGROUND OF THE INVENTION

This invention relates to a supported gas separation membrane for separating a particular gaseous component from a mixture of gases. More particularly, this invention is directed to a gas separation membrane having an asymmetric gas separation membrane layer and a porous polymeric support layer, to a process for its manufacture and to a process for its use in separating a particular component from a mixture of gases.

The use of a gas separation membrane for separating a particular component from a mixture of gases is well known. See, e.g., U.S. Pat. Nos. 4,512,893, 4,717,394, 4,818,452, 4,902,422, 4,981,497, 5,042,993, 5,067,970, 5,165,963, 5,178,940, 5,234,471, 5,248,319, 5,262,056, 5,633,039 and 5,591,250. Examples of the type of gases separated by a gas separation membrane include carbon dioxide from methane, hydrogen from various gas mixtures, organic vapors from various gas mixtures, producing nitrogen, producing oxygen enriched air, etc. When using a gas separation membrane to separate a particular component from a gas mixture, one side of the membrane will be contacted with a complex multi-component gas mixture. Typically, certain gas(es) in the gas mixture will permeate through the gas separation membrane at a faster rate than the other gas(es). The gas permeation rate through the gas separation membrane is a property of the membrane material composition and its morphology.

Gas separation membranes may be asymmetric, i.e., possessing a relatively dense, nonporous region and a relatively less dense, porous region, or they may be symmetric, i.e., possessing a substantially uniform, nonporous structure throughout. Examples of an asymmetric gas separation membrane can be found in U.S. Pat. Nos. 4,512,893, 4,818,452, 4,902,422, 5,067,970, 5,165,963, 5,178,940 and 5,633,039. This type of gas separation membrane can be obtained by a solvent evaporation/coagulation procedure.

U.S. Pat. No. 5,591,250 discloses an unsupported, symmetric gas separation membrane derived from a certain class of polyimides.

SUMMARY OF THE INVENTION

In accordance with the present invention, a supported gas separation membrane is provided which comprises (a) a porous polymeric support layer and (b) an asymmetric gas separation membrane layer formed from a polyimide having repeating units of the general formula:

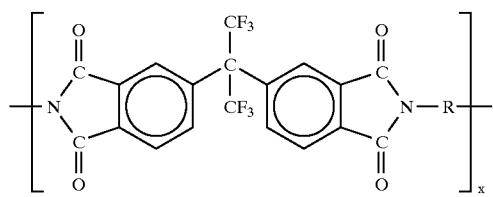

wherein R is:

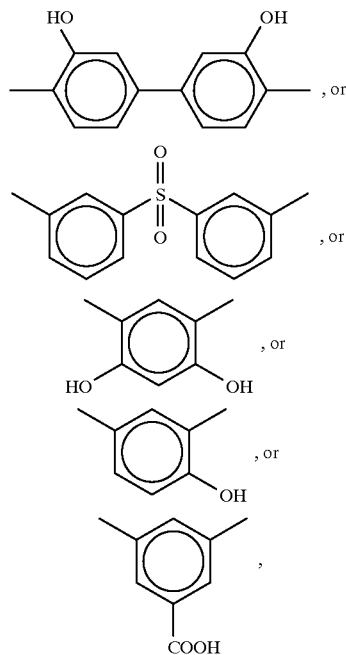

and x is an integer.

Further in accordance with this invention, a process for manufacturing a supported gas separation membrane is provided which comprises:

a) providing a porous polymeric support layer;

b) applying to one surface of the porous polymeric support layer an asymmetric gas separation membrane layer-forming solution comprising (i) a polyimide having repeating units of the general formula:

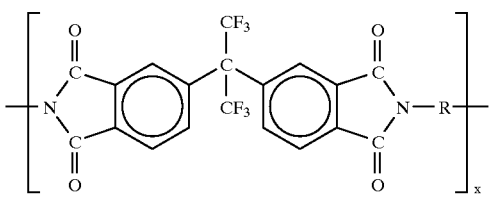

wherein R and x have the aforestated meanings, (ii) at least one water-miscible organic solvent for the polyimide and (iii) at least one non-solvent that is miscible with water-miscible organic solvent (ii) but is a non-solvent for the polyimide;

c) partially evaporating organic solvent (ii) from the asymmetric gas separation membrane layer-forming solution to provide a partially formed asymmetric gas separation membrane layer on the porous polymeric support layer, the partially formed asymmetric gas separation membrane layer possessing an integral skin on its exposed surface;

d) contacting the partially formed asymmetric gas separation membrane layer with a coagulating medium to impart an asymmetric structure to, and complete the formation of, the asymmetric gas separation membrane layer; and, e) washing and drying the supported gas separation membrane.

Still further in accordance with this invention, a process for separating a first gas from a second gas is provided which comprises:

a) providing a supported gas separation membrane having a porous polymeric support layer and an asymmetric gas separation membrane layer formed from a polyimide having repeating units of the general formula:

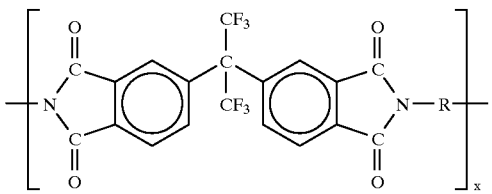

wherein R and x have the aforestated meanings, b) contacting one side of the supported gas separation membrane with a feed gas mixture containing at least the first gas and the second gas, wherein the supported gas separation membrane divides a separation chamber into a high-pressure side into which the feed gas mixture is fed and a low-pressure side;

c) maintaining a pressure differential across the supported gas separation membrane under conditions such that the first gas in the feed gas mixture selectively permeates through the supported gas separation membrane from the high-pressure side to the low-pressure side of the supported gas separation membrane;

d) removing from the low-pressure side of the supported gas separation membrane permeated gas mixture which is enriched in the first gas and depleted in the second gas; and, e) removing from the high-pressure side of the supported gas separation membrane a gas mixture which is enriched in the second gas and depleted in the first gas.

The supported asymmetric gas separation membrane of this invention exhibits a higher selectivity than known gas separation membranes. This greater selectivity is advantageous when, for example, separating carbon dioxide from natural gas streams since it reduces the loss of valuable methane.

DESCRIPTION OF THE PREFERRED EMBODIMENTS

The supported gas separation membrane of this invention is obtained by providing a porous polymeric support layer, optionally possessing a backing layer, to which the asymmetric gas separation membrane layer is then applied. The porous polymeric support layer can be obtained employing methods known in the art.

Useful materials for forming the support layer include polymers such as polyetherimides, polyether ether ketones, polyacrylonitriles and the like. Preferred polymers are polyetherimides. A preferred polyetherimide for use herein as the support layer is Ultem-1000 available from General Electric. The useful polymers generally possess a molecular weight of from about 5,000 to about 25,000 and preferably from about 10,000 to about 15,000. The support layer will ordinarily have a thickness ranging from about 20 to about 100 microns and preferably from about 40 to about 60 microns. The optional backing layer can be obtained employing methods known in the art. A useful backing layer for use herein is a nonwoven polyester fabric ranging in thickness from about 100 to about 350 microns and preferably from about 150 to about 250 microns. A porous polymeric support layer based on Ultem-1000 and possessing a nonwoven polyester fabric backing layer that can be used herein is commercially available from GKSS Forschungszentrum Geesthacht GmbH (Geesthacht, Germany).

Generally, the porous polymeric support layer can be formed into any suitable configuration such as a flat sheet, hollow fiber and the like, employing known methods. As one skilled in the art will readily appreciate, the flat sheet can be further formed into a configuration such as a spiral wound module or a plate and frame. Preferred configurations include hollow fiber and spiral wound module. It is to be further understood that when forming the porous polymeric support layer into the configuration of a hollow fiber, the porous polymeric support layer will not possess a backing layer.

Following the formation of the porous polymeric support layer and its backing layer, if any, an asymmetric gas separation membrane layer-forming solution is applied to an exposed surface of the support layer. To prepare the asymmetric gas separation membrane layer-forming solution, a polyimide having repeating units of the general formula:

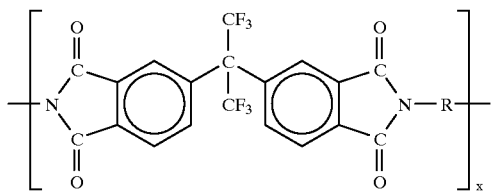

wherein R and x have the aforestated meanings is dissolved in at least one water-miscible organic solvent and at least one non-solvent. The polyimide and its preparation are disclosed in U.S. Pat. No. 5,591,250, the contents of which are incorporated by reference herein. Suitable polyimides include poly[2,2-bis(3,4-dicarboxyphenyl) hexafluoropropane diimino hydroxy benzidine], poly[2,2-bis(3-carboxyphenyl)hexafluoropropane imidiazo 3,3'-benzidine], poly[2,2'-bis(3,4-dicarboxyphenyl) hexafluoropropane diimino 4,4'-diphenysulfone], poly[2,2-bis(3,4-dicarboxyphenyl)hexafluoropropane 2,4-diaminophenol], poly[2,2-bis(3,4-dicarboxyphenyl) hexafluoropropane 3,5-diaminobenzoic acid], poly[(1,3-dihydro-1,3-dihydro-1,3-dioxo-2H-isoindole-2,5-diyl)-2,2, 2-trifluoro-1-(trifluoromethyl)-ethylidene-(1,3-dihydro-1,3-dioxo-2H-isoindole-2,5-diyl)-2,4-dihydroxyphenylene], poly[2,2'-bis(3,4-dicarboxyphenyl)hexafluoropropane diimino 4,4'-oxydiamine co 2,2-bis(3,4-dicarboxyphenyl) hexafluoropropane diimino 3,5-benzoic acid(1:1)], poly[2, 2'-bis(3,4-dicarboxyphenyl)hexafluoropropane diimino 4,4'-oxydiamine co 2,2-bis(3,4-dicarboxyphenyl) hexafluoropropane diimino 2,5-benzenesulfonic acid(1:1)], poly[(1,3-dihydro-1,3-dioxo-2H-isoindole-2,5-diyl)-2,2,2-trifluoro-1-(trifluoromethyl)ethylidine-(1,3-dihydro-1,3-dioxo-2H-isoindole-2,5-diyl)-1,3-phenylene-co-3, 3'phenylenesulfone], poly[(1,3-dihydro-1,3-dioxo-2H-isoindole-2,5-diyl)-2,2,2-trifluoro-1-(trifluoromethyl) ethylidene-(1,3-dihydro-1,3-dioxo-2H-isoindole-2,5-diyl)-2,2'-bis(4-hydroxyphenyl)-2,2,2-trifluoro-1-(trifluoromethyl)ethylidene-co-3,3'-dihydroxy benzidine] and poly[(1,3-dihydro-1,3-dioxo-2H-isoindole-2,5-diyl)-2, 2,2-trifluoro-1-(trifluoromethyl)ethylidene-(1,3-dihydro-1, 3-dioxo-2H-isoindole-2,5-diyl)-2,4-phenyl-co-1,3-phenylene]. A preferred polyimide is poly[2,2-bis(3,4-dicarboxyphenyl) hexafluoropropane diimino hydroxy benzidine]. The useful polyimides generally possess a molecular weight of from about 50,000 to about 300,000 and preferably from about 75,000 to about 90,000. Such polyimides generally possess an intrinsic viscosity of from about 0.5 to about 1.7 dL/g and preferably from about 1.0 to about 1.2 dL/g.

Suitable water-miscible organic solvents for dissolving the foregoing polyimide include ketones such as acetone and methyl ethyl ketone; dioxane; N-alkylpyrrolidones such as N-methylpyrrolidone (NMP); N-alkylpiperidones such as N-methylpiperidone; dialkylacetamides such as dimethylacetamide; dialkylformamides such as dimethylformamide (DMF); and the like. It is especially advantageous to use ketones as the water-miscible organic solvent to dissolve the aforementioned polyimide. Preferable water-miscible organic solvents include acetone and NMP.

Useful non-solvents that are miscible with the water-miscible polyimide-dissolving organic solvents include water and alcohols such as methanol, ethanol, propanol, isopropanol, butanol, isobutanol and the like. Preferable non-solvents include water and isopropanol.

Generally, the amount of polyimide in the asymmetric gas separation membrane layer-forming solution can range from about 3 to about 13 weight percent and preferably from about 5 to about 6 weight percent. The amount of water-miscible organic solvent (ii) in the asymmetric gas separation membrane layer-forming solution can vary widely and, e.g., in the case of acetone can range from about 60 to about 95 weight percent and in the case of NMP can range from about 0 to about 20 weight percent. The amount of non-solvent (iii) in the asymmetric gas membrane layer-forming solution can also vary within wide limits and, e.g., for water can range from about 0 to about 8 weight percent and for isopropanol can range from about 10 to about 50 weight percent. The asymmetric gas separation membrane layer-forming solution generally possesses a viscosity of from about 100 to about 1400 cp and preferably from about 800 to about 1,000 cp. If desired, additives such as viscosity enhancers can also be added to the asymmetric gas separation membrane layer-forming solution. Useful viscosity enhancers include polyvinyl pyrrolidones, polyethylene glycols and urethanes. Typically, the amount of the viscosity enhancer will range from about 0 to about 40 percent and preferably from about 5 to about 10 percent by weight of the asymmetric gas separation membrane layer-forming solution.

Following its formation, the asymmetric gas separation membrane layer-forming solution is cast upon, or otherwise applied to, an exposed surface of the porous polymeric support layer using, for example, a bar or doctor blade, to provide a coating upon the support layer. The asymmetric gas separation membrane layer-forming solution is typically applied to the porous polymeric support layer to provide a thickness ranging from about 1 to about 10 mils and preferably from about 3 to about 5 mils.

The water-miscible organic solvent is then partially evaporated from the asymmetric gas separation membrane layer-forming solution by, for example, allowing the coated porous polymeric support layer to stand in ambient air. The time required for the organic water-miscible solvent to partially evaporate will ordinarily range from about 1 to about 20 seconds and more usually from about 5 to about 15 seconds. Upon partial evaporation of the water-miscible organic solvent, a partially formed asymmetric gas separation membrane layer possessing an integral skin will have formed on the exposed surface of the support layer.

The coated porous polymeric support layer is then contacted with a coagulating medium which imparts an asymmetric structure to, and complete the formation of, the asymmetric gas separation membrane layer. Useful coagulants include water, alcohols, ammonia and mixtures thereof. A preferred coagulant is water. The temperature of the coagulating medium can range from about ambient to about 50° C., preferably from about 5° C. to about 30° C. and more preferably from about 7° C. to about 15° C. The coated porous polymeric support can remain in the coagulating medium for a period ranging from about 1 to about 300 seconds and preferably from about 100 to about 200 seconds. During coagulation, additional amounts of water-miscible organic solvent enter the coagulating medium thus providing an asymmetric gas separation membrane layer characterized by an integral skin on its upper surface, a contiguous relatively dense, porous region and, therebeneath, a relatively less dense, porous region. The thickness of the asymmetric gas separation membrane layer will ordinarily range from about 1 to about 10 mils and preferably from about 3 to about 5 mils.

Following formation of the asymmetric gas separation membrane layer on the porous polymeric support layer, the structure is immersed in a rinse tank, e.g., of water at from about 20° C. to about 70° C. to substantially remove any residual water-miscible organic solvent and non-solvent that may still be present. The asymmetric gas separation membrane layer can remain in the rinse tank for a period ranging from about 1 to about 15 minutes and preferably from about 5 to about 12 minutes. The asymmetric gas separation membrane layer can then be washed to remove any remaining residual water-miscible organic solvent or residual non-solvent by washing it in a final bath containing, e.g., water or deionized water, to provide an asymmetric gas separation membrane layer substantially free of water-miscible organic solvent and any non-solvent. The final bath will ordinarily be at a temperature from about ambient to about 50° C. and preferably from about 15° C. to about 30° C. The asymmetric gas separation membrane layer can remain in the final bath for a period ranging from about 30 seconds to about 300 seconds and preferably from about 45 seconds to about 150 seconds.

The asymmetric gas separation membrane layer is then dried in a current of air, e.g., oxygen, nitrogen and the like, to provide the product supported gas separation membrane. The temperature of the air can range from about 30° C. to about 60° C. and preferably from about 45° C. to about 50° C. for a period of from about 1 minute to about 10 minutes and preferably from about 4 minutes to about 6 minutes.

The supported gas separation membrane of this invention is particularly useful for separating and concentrating a particular gaseous component from a mixture of gases. The mixture of gases can be, for example, carbon dioxide and methane, oxygen and nitrogen, hydrogen and carbon monoxide, water vapor and methane and the like. A preferred mixture of gases for use of the supported gas separation membrane of this invention is carbon dioxide and methane in which carbon dioxide is removed from natural gas leaving the desirable methane in higher concentration. Thus, if the separation process is performed effectively, the supported gas separation membrane of this invention can upgrade low quality natural gas to high quality natural gas.

Typically, the process of separating a particular gaseous component from a mixture of gases will involve contacting one side of the membrane with a feed gas mixture containing at least the gas whose enrichment is desired, along with one or more other gases. The membrane divides a separation chamber into a high-pressure side into which the feed gas mixture is fed and a low-pressure side. A pressure differential is maintained across the membrane under conditions such that at least one but less than all the gases in the feed gas mixture selectively permeates through the membrane from the high pressure side to the low-pressure side of the membrane. Then the gas mixture which is relatively enriched in a first group of gases (i.e. one or more gases) and depleted in a second, different, group of gases (i.e. one or more different gases) can be removed from the low-pressure side of the membrane, while a gas mixture which is enriched in the second group of gases and depleted in the first group of gases can be removed from the high-pressure side of the membrane.

The effectiveness of a separation process can be judged by a number of factors. One is the throughput in terms of volume of gas processed per unit time. Another is the efficiency in terms of the constitution of the final product as compared to the constitution of the product initially fed into the system.

The membrane ordinarily acts to separate gases by virtue of gas permeation. Permeation can describe the overall mass transport of "penetrant gas" across the membrane where the penetrant gas is introduced at a higher pressure than the pressure on the opposite side of the membrane. The gas mixture being separated is known as the feed, that which passes through the membrane is the permeate, and that which does not pass through the membrane is the retentate. Typically, in the separation process, the membrane being used exhibits a higher selectivity for one component, say A than the other, say B. A permeates faster than B, hence relative to the feed, the permeate is enriched in A and the retentate is enriched in B.

The standard unit for measuring the permeability of gases through a supported gas separation membrane is the Barrer, which is defined as follows:

$$1 \text{ Barrer} = \frac{10^{-10} \text{ cm}^3 (STP) \times \text{cm.}}{\text{cm}^2 \times \text{sec.} \times \text{cm. Hg.}}$$

wherein the flux (flow rate) in units of $cm^3/cm^2 \times sec.$; being volume per seconds of permeated gas at standard temperature and pressure, cm is the thickness of the film, $cm^2$ is the area of film, and cm. Hg is the pressure (or driving force).

The selectivity of a supported gas separation membrane in separating a two-component fluid mixture is defined as the ratio of the rate of passage of the more readily passed component to the rate of passage of the less readily passed component. Selectivity may be obtained directly by contacting a supported gas separation membrane with a known mixture of gases and analyzing the permeate. Alternatively, a first approximation of the selectivity is obtained by calculating the ratio of the rates of passage of the two components determined separately on the same gas separation membrane. Rates of passage may be expressed in Barrer units. As an example of selectivity, a $O_2/N_2=10$ indicates that the subject membrane allows oxygen gas to pass through at a rate ten times that of nitrogen.

The productivity of a gas separation membrane is measured in GPUs which is defined as follows:

$$GPU = 10^{-6} \times \frac{cm^3 (STP)}{cm^2 \times sec. \times cm. \text{ Hg}}$$

The following examples illustrate the supported gas separation membrane of this invention.

EXAMPLE 1

This example illustrates the preparation of a porous polymeric support layer.

A casting solution was prepared that contained 17 weight percent Ultem-1000 manufactured and sold by General Electric Plastics, 3 weight percent polyvinylpyrrolidone (350,000 molecular weight) and a 50/50 solvent mixture of N-methylpyrrolidone (NMP) and dimethylformamide. The casting solution was cast onto a nonwoven polyester fabric at a wet thickness of 6 mils with a knife blade. The coated nonwoven polyester fabric was then immersed in a water bath at 11° C. for one minute to form a porous polymeric support layer. The porous polymeric support layer was then rinsed in a 50° C. water bath for 8 to 10 minutes and then immersed in a final bath at 20° C. The damp porous polymeric support layer was dried at 50° C. for 5 minutes.

EXAMPLE 2

This example illustrates the preparation of a supported asymmetric gas separation membrane.

An asymmetric gas separation membrane layer-forming solution was prepared containing 10 weight percent of poly[2,2-bis(3,4-dicarboxyphenyl) hexafluoropropane diimino hydroxy benzidine] (6FDA-HAB), 54 weight percent acetone, 15 weight percent isopropanol, 20 weight percent NMP and 1 weight percent water. The asymmetric gas separation membrane layer-forming solution was cast onto a dry porous polymeric support layer with a knife blade at a thickness of 3 mils. The coated porous polymeric support layer was left to dry in the air for 8 seconds. The coated porous polymeric support layer was then immersed in water at 10° C. for 1 minute, immersed in a rinse tank of water at 50° C. for 8 to 10 minutes and then immersed in a final water bath at 20° C. for 5 minutes to form an asymmetric gas separation membrane layer. Finally, the asymmetric gas separation membrane layer was dried at 60° C. for 5 minutes to provide the supported asymmetric gas separation membrane layer. The membrane had a $CO_2/CH_4$ pure gas selectivity of 101 at a single gas feed pressure of 150 psi.

EXAMPLE 3

This example illustrates the preparation of a porous polymeric support layer.

A casting solution was prepared by dissolving 17 weight percent Ultem in a 50/50 solvent mixture of NMP and dimethylacetamide. The casting solution was cast onto a backing layer of a nonwoven polyester fabric with a knife at a thickness of 6 mils. The coated nonwoven polyester fabric was quenched in a bath of water at 11° C. for a period of one minute to form a porous polymeric support layer. The porous polymeric support layer was then immersed in a rinse tank of water at 50° C. for a period of 10 minutes and subsequently immersed in an annealing tank of water at 20° C. for a period of 3 minutes. Surface water was removed from the surface of the porous polymeric support layer using an air knife on the surface and a vacuum of the back of the porous polymeric support layer. The damp porous polymeric support layer was then dried at 60° C. for 5 minutes.

EXAMPLE 4

The following example illustrates the preparation of a supported asymmetric gas separation membrane.

An asymmetric gas separation membrane layer-forming solution was prepared containing 8 weight percent 6FDA- HAB, 70 weight percent acetone, 16.75 weight percent isopropanol and 0.25 weight percent water. The asymmetric gas separation membrane layer-forming solution had a viscosity of 1075 cp and was cast onto the porous polymeric support layer of Example 3 using a blade at a thickness of 4 mils. The coated porous polymeric support layer was left to stand in air for 7 seconds and then immersed for 3 minutes in a tank of water maintained at 100° C. The coated porous polymeric support layer was then immersed for 10 minutes in a tank of water maintained at 45° C. and subsequently immersed for a period of 3 to 8 minutes in a tank of deionized water maintained at room temperature to form an asymmetric gas separation membrane layer. Finally, the asymmetric gas separation membrane layer was dried at 50° C. for 20 to 30 minutes to provide the supported asymmetric gas separation membrane.

EXAMPLE 5

The following example illustrates the preparation of a supported asymmetric gas separation membrane.

An asymmetric gas separation membrane layer-forming solution was prepared containing 8 weight percent 6FDA-HAB, 76 weight percent acetone, 15 weight percent isopropanol and 1 weight percent water. The asymmetric gas separation membrane layer-forming solution had a viscosity of 669 cp and was cast onto the porous polymeric support layer of Example 3 using a blade at a thickness of 4 mils. The coated porous polymeric support layer was left to stand in air for 7 seconds and then immersed for 3 minutes in a tank of water maintained at 10° C. The coated porous polymeric support layer was then immersed for 10 minutes in a tank of water maintained at 45° C. and subsequently immersed for a period of 3 to 8 minutes in a tank of deionized water maintained at room temperature to form an asymmetric gas separation membrane layer. Finally, the asymmetric gas separation membrane layer was dried at 50° C. for 20 to 30 minutes to provide the supported asymmetric gas separation membrane.

EXAMPLE 6

The following example illustrates the preparation of a supported asymmetric gas separation membrane.

An asymmetric gas separation membrane layer-forming solution was prepared containing 10 weight percent 6FDA-HAB, 64 weight percent acetone, 10 weight percent NMP, 15 weight percent isopropanol and 1 weight percent water. The asymmetric gas separation membrane layer-forming solution had a viscosity of 470 cp and was cast onto the Ultem porous polymeric support layer purchased from GKSS Forschungszentrum Geesthacht GMB II using a blade at a thickness of 3 mils. The coated porous polymeric support layer was left to stand in air for 7 seconds and then immersed for 3 minutes in a tank of water maintained at 10° C. The coated porous polymeric support layer was then immersed for 10 minutes in a tank of water maintained at 45° C. and subsequently immersed for a period of 3 to 8 minutes in a tank of deionized water maintained at room temperature to form an asymmetric gas separation membrane layer. Finally, the asymmetric gas separation membrane layer was dried at 50° C. for 20 to 30 minutes to provide the supported asymmetric gas separation membrane.

EXAMPLE 7

The following example illustrates the preparation of a supported asymmetric gas separation membrane.

An asymmetric gas separation membrane layer-forming solution was prepared containing 10 weight percent 6FDA-HAB, 54 weight percent acetone, 20 weight percent NMP, 15 weight percent isopropanol and 1 weight percent water. The asymmetric gas separation membrane layer-forming solution had a viscosity of 1074 cp and was cast onto an Ultem porous polymeric support layer purchased from GKSS Forschungszentrum Geesthacht GMB II using a blade at a thickness of 3 mils. The coated porous polymeric support layer was left to stand in air for 7 seconds and then immersed for 3 minutes in a tank of water maintained at 10° C. The coated porous polymeric support layer was then immersed for 10 minutes in a tank of water maintained at 45° C. and subsequently immersed for a period of 3 to 8 minutes in a tank of deionized water maintained at room temperature to form an asymmetric gas separation membrane layer. Finally, the asymmetric gas separation membrane layer was dried at 50° C. for 20 to 30 minutes to provide the supported asymmetric gas separation membrane.

EXAMPLE 8

The following example illustrates the preparation of a supported asymmetric gas separation membrane.

An asymmetric gas separation membrane layer-forming solution was prepared containing 10 weight percent 6FDA-HAB, 64 weight percent acetone, 10 weight percent NMP, 15 weight percent isopropanol and 1 weight percent water. The asymmetric gas separation membrane layer-forming solution had a viscosity of 470 cp and was cast onto the porous polymeric support layer of Example 3 using a blade at a thickness of 3 mils. The coated porous polymeric support layer was left to stand in air for 7 seconds and then immersed for 3 minutes in a tank of water at 10° C. The coated porous polymeric support layer was then immersed for 10 minutes in a tank of water maintained at 45° C. and subsequently immersed for period of 3 to 8 minutes in a tank of deionized water maintained at room temperature to form an asymmetric gas separation member layer. Finally, the asymmetric gas separation membrane layer was dried at 50° C. for 20 to 30 minutes to provide the supported asymmetric gas separation membrane.

EXAMPLE 9

The following example illustrates the preparation of a supported asymmetric gas separation membrane.

An asymmetric gas separation membrane layer-forming solution was prepared containing 10 weight percent 6FDA-HAB, 64 weight percent acetone, 10 weight percent NMP, 15 weight percent isopropanol and 1 weight percent water. The asymmetric gas separation membrane layer-forming solution had a viscosity of 470 cp and was cast onto the porous polymeric support layer of Example 3 using a blade at a thickness of 3 mils. The coated porous polymeric support layer was left to stand in air for 7 seconds and then immersed for 3 minutes in a tank of water at 10° C. The coated porous polymeric support layer was then immersed for 10 minutes in a tank of water maintained at 45° C. and subsequently immersed for a period of 3 to 8 minutes in a tank of deionized water maintained at room temperature to form an asymmetric gas separation membrane layer. Finally, the asymmetric gas separation membrane layer was dried at 50° C. for 20 to 30 minutes to provide the supported asymmetric gas separation membrane.

Table 1 shows the permeability coefficients for $CO_2$ and $CH_4$, $CO_2/CH_4$ selectivity for a time lag study and $CO_2/CH_4$ selectivity conducted at two different permeate pressures for a mixed gas study obtained with gas mixtures of approximately 10 mole percent $CO_2$ and 90 mole percent $CH_4$ using the supported asymmetric gas separation membranes of Examples 4–9.

TABLE 1

| Sample | Permeability Coefficients[1] | | time lag[2] | Selectivity | |
|---|---|---|---|---|---|
| | $PCO_2$ | $PCH_4$ | | Mixed Gas[3] | Mixed Gas[4] |
| Example 4 | 7.3 | 0.091 | 80 | 63 | 57 |
| Example 5 | 7.6 | 0.075 | 101 | 50[5] | 31[5] |
| Example 6 | 7.2 | 0.066 | 109 | 79 | 73 |
| Example 7 | 7.41 | 0.068 | 109 | 97 | 70 |
| Example 8 | 7.83 | 0.071 | 110 | 85 | 51 |
| Example 9 | 6.36 | 0.079 | 81 | 69 | 52 |

[1]Unit of Permeability Coefficient: Barrer, by pure gas experiments
[2]Temperature: 35° C.; Feed Pressure: 150 psi
[3]Temperature: 35° C.; Feed Pressure: 400 psi; Permeate Pressure: 0.3 atm
[4]Temperature: 35° C.; Feed Pressure: 400 psi; Permeate Pressure: 1.0 atm
[5]Temperature: 35° C.; Feed Pressure: 600 psi Table 2 shows the productivity of the supported asymmetric gas separation membranes of Examples 6–9 using 10 percent carbon dioxide and 90 percent methane at a temperature of 35° C. and a feed pressure of 400 psi.

TABLE 2

| Sample | Mixed Gas Productivities[1] | |
|---|---|---|
| | P/l $CO_2$ | P/l $CH_4$ |
| Example 6 | 3.6 | 0.046 |
| Example 7 | 4.12 | 0.042 |
| Example 8 | 2.24 | 0.026 |
| Example 9 | 2.12 | 0.031 |

[1]Unit of Productivity: GPU, measured with a stage cut of less than 0.01%.

EXAMPLE 10

The following example illustrates the preparation of a supported asymmetric gas separation membrane.

An asymmetric gas separation membrane layer-forming solution was prepared containing 10 weight percent 6FDA-HAB, 54 weight percent acetone, 15 weight percent isopropanol, 1 weight percent water and 20 weight percent NMP. The asymmetric gas separation membrane layer-forming solution was cast on the porous polymeric support layer of Example 3 using a knife at a thickness of 3 mils. The coated porous polymeric support layer was then quenched in a bath of water at 10° C. for a period of 3 minutes and subsequently immersed in a rinse tank of water at 50° C. for a period of 10 minutes to provide the supported asymmetric gas separation membrane.

EXAMPLE 11

The following example illustrates the preparation of a supported asymmetric gas separation membrane.

An asymmetric gas separation membrane layer-forming solution was prepared containing 10 weight percent 6FDA-HAB, 54 weight percent acetone, 15 weight percent isopropanol, 1 weight percent water and 20 weight percent NMP. The asymmetric gas separation membrane layer-forming solution was cast on an Ultem porous polymeric support layer purchased from GKSS Forschungszentrum Geesthacht GMB II using a knife at a thickness of 3 mils. The coated porous polymeric support layer was then quenched in a bath of water at 10° C. for a period of 3 minutes and subsequently immersed in a rinse tank of water at 50° C. for a period of 10 minutes to provide the supported asymmetric gas separation membrane.

Table 3 shows the permeability coefficients for $CH_4$ and $CO_2$ and $CO_2/CH_4$ selectivity for a pure gas study and the permeability for $CO_2$ and $CO_2/CH_4$ selectivity for a mixed gas study using the supported asymmetric gas separation membranes of Examples 10 and 11.

TABLE 3

| Sample | Pure Gas[1] | | | Mixed Gas[2] | |
|---|---|---|---|---|---|
| | $PCH_4$ (GPU) | $PCO_2$ (GPU) | Selectivity | $PCO_2$ (GPU) | Selectivity |
| Example 10 | 0.047 | 3.03 | 65 | 5.2 | 34 |
| Example 11 | 0.14 | 14.22 | 102 | 14.4 | 77 |

[1]Temperature: 35° C.; Feed Pressure: 150 psi; Permeate Pressure: 1.0 atm
[2]Temperature: 35° C.; Feed Pressure: 400 psi; Permeate Pressure: 1.0 atm

What is claimed is:

1. A process for separating a first gas from a second gas which comprises:

a) providing a supported gas separation membrane having a porous polymeric support layer and an asymmetric gas separation membrane layer formed from a polyimide having repeating units of the general formula:

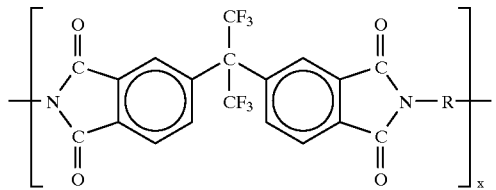

wherein R is:

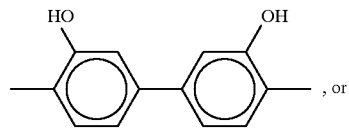

, or

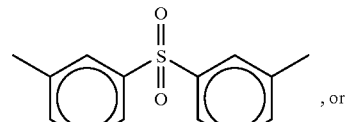

, or

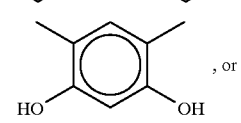

, or

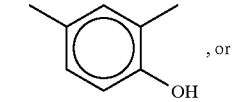

, or

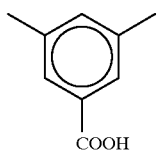

and x is an integer;

b) contacting one side of the supported gas separation membrane with a feed gas mixture containing at least the first gas and the second gas, wherein the supported gas separation membrane divides a separation chamber into a high-pressure side into which the feed gas mixture is fed and a low-pressure side;

c) maintaining a pressure differential across the supported gas separation membrane under conditions such that the first gas in the feed gas mixture selectively permeates through the supported gas separation membrane from the high-pressure side to the low-pressure side of the supported gas separation membrane;

d) removing from the low-pressure side of the supported gas separation membrane permeated gas mixture which is enriched in the first gas and depleted in the second gas; and e) removing from the high-pressure side of the supported gas separation membrane a gas mixture which is enriched in the second gas and depleted in the first gas.

2. The process of claim 1 wherein the porous polymeric support layer possesses a definite configuration selected from the group consisting of a hollow fiber and a spiral wound module.

3. The process of claim 2 wherein the spiral wound module includes a backing layer.

4. The process of claim 1 wherein the porous polymeric support layer is a polymer selected from the group consisting of polyetherimide, polyether ether ketone and polyacrylonitrile.

5. The process of claim 4 wherein the molecular weight of the polymer is about 5,000 to about 25,000.

6. The process of claim 1 wherein the thickness of the porous polymeric support layer is about 50 to about 60 microns.

7. The process of claim 1 wherein the polyimide is poly[2,2-bis(3,4-dicarboxyphenyl) hexafluoropropane diimino hydroxy benzidine].

8. The process of claim 1 wherein the thickness of the asymmetric gas separation membrane layer is about 3 to about 5 mils.

9. The process of claim 1 wherein the first gas is carbon dioxide and the second gas is methane.

10. A supported gas separation membrane comprising (a) a porous polymeric support layer and (b) an asymmetric gas separation membrane layer formed from a polyimide having repeating units of the general formula:

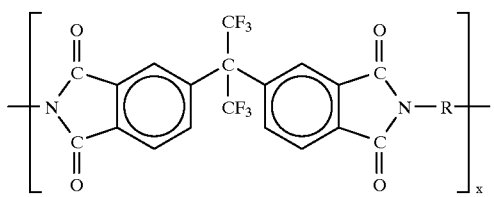

wherein R is:

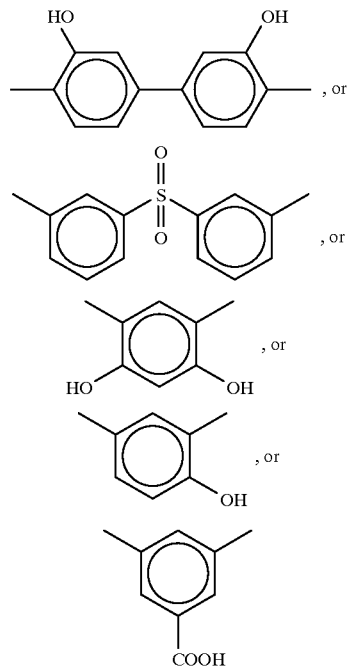

and x is an integer.

11. The supported gas separation membrane of claim 10 wherein the porous polymeric support layer possesses a definite configuration selected from the group consisting of a hollow fiber and a spiral wound module.

12. The supported gas separation membrane of claim 11 wherein the spiral wound module includes a backing layer.

13. The supported gas separation membrane of claim 12 wherein the backing layer is a non-woven polyester fabric.

14. The supported gas separation membrane of claim 10 wherein the porous polymeric support layer is a polymer selected from the group consisting of polyetherimide, polyether ether ketone and polyacrylonitrile.

15. The supported gas separation membrane of claim 14 wherein the molecular weight of the polymer is about 5,000 to about 25,000.

16. The supported gas separation membrane of claim 10 wherein the thickness of the porous polymeric support layer is about 50 to about 60 microns.

17. The supported gas separation membrane of claim 10 wherein the polyimide is poly[2,2-bis(3,4-dicarboxyphenyl) hexafluoropropane diimino hydroxy benzidine].

18. The supported gas separation membrane of claim 10 wherein the thickness of the asymmetric gas separation membrane layer is about 3 to about 5 mils.

19. A process for manufacturing a supported gas separation membrane comprising:

a) providing a porous polymeric support layer;

b) applying to one surface of the porous polymeric support layer an asymmetric gas separation membrane layer-forming solution comprising (i) a polyimide having repeating units of the general formula:

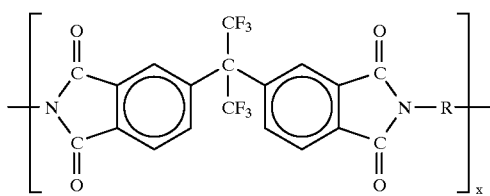

wherein R is:

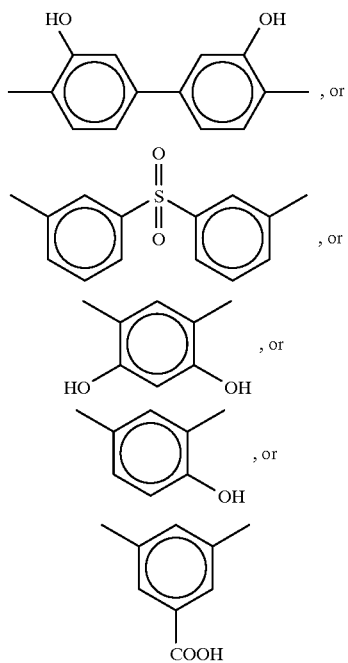

and x is an integer, (ii) at least one water-miscible organic solvent for the polyimide and (iii) at least one non-solvent that is miscible with water-miscible organic solvent (ii) but is a non-solvent for the polyimide;

c) partially evaporating water-miscible organic solvent (ii) from the asymmetric gas separation membrane layer-forming solution to provide a partially formed asymmetric gas separation membrane layer on the polymeric support layer, the partially formed asymmetric separation membrane layer possessing an integral skin on its exposed surface;

d) contacting the partially formed asymmetric gas separation membrane layer with a coagulating medium to impart an asymmetric structure to, and complete the formation of, the asymmetric gas separation membrane layer; and, e) washing and drying the supported gas separation membrane.

20. The process of claim 19 wherein the porous polymeric support layer of step (a) possesses a definite configuration selected from the group consisting of a hollow fiber and a spiral wound module.

21. The process of claim 20 wherein the spiral wound module includes a backing layer.

22. The process of claim 19 wherein the porous polymeric support layer is a polymer selected from the group consisting of a polyetherimide, polyether ether ketone and polyacrylonitrile.

23. The process of claim 22 wherein the molecular weight of the polymer is about 5,000 to about 25,000.

24. The process of claim 19 wherein the thickness of the porous polymeric support layer is about 50 to about 60 microns.

25. The process of claim 19 wherein the polyimide is poly[2,2-bis(3,4-dicarboxyphenyl) hexafluoropropane diimino hydroxy benzidine].

26. The process of claim 19 wherein water-miscible organic solvent (ii) is selected from the group consisting of ketone, N-alkylpyrrolidone, N-alkylpiperidone and dialkylacetamide.

27. The process of claim 26 wherein the ketone is selected from the group consisting of acetone and methyl ethyl ketone.

28. The process of claim 26 wherein the N-alkylpyrrolidone is N-methylpyrrolidone.

29. The process of claim 19 wherein water-miscible organic solvent (ii) comprises a major amount of acetone and a minor amount of N-methylpyrrolidone.

30. The process of claim 19 wherein non-solvent (iii) is selected from the group consisting of water, lower alkanols and their mixtures.

31. The process of claim 19 wherein the thickness of the asymmetric gas separation membrane layer of step (d) is about 3 to about 5 mils.

* * * * *

UNITED STATES PATENT AND TRADEMARK OFFICE
CERTIFICATE OF CORRECTION

PATENT NO. : 5,928,410
DATED : July 27, 1999
INVENTOR(S) : Jois et al.

It is certified that error appears in the above-identified patent and that said Letters Patent is hereby corrected as shown below:

Column 9, line 8, change "100°C" to --10°C--.

Signed and Sealed this

First Day of February, 2000

Attest:

Attesting Officer

Q. TODD DICKINSON

Acting Commissioner of Patents and Trademarks